US009943715B2

(12) United States Patent
Cordani et al.

(10) Patent No.: US 9,943,715 B2
(45) Date of Patent: Apr. 17, 2018

(54) CELLULAR TELEPHONE SUPPORT BED FOR RECHARGE

(71) Applicant: GelTech Solutions, Inc., Jupiter, FL (US)

(72) Inventors: Peter Cordani, Palm Beach Gardens, FL (US); Michael Reger, Jupiter, FL (US)

(73) Assignee: GelTech Solutions, Inc., Jupiter, FL (US)

( * ) Notice: Subject to any disclaimer, the term of this patent is extended or adjusted under 35 U.S.C. 154(b) by 0 days.

(21) Appl. No.: 15/794,722

(22) Filed: Oct. 26, 2017

(65) Prior Publication Data

US 2018/0043195 A1 Feb. 15, 2018

Related U.S. Application Data

(63) Continuation-in-part of application No. 14/682,542, filed on Apr. 9, 2015, which is a continuation-in-part of application No. 14/620,925, filed on Feb. 12, 2015.

(60) Provisional application No. 62/064,011, filed on Oct. 15, 2014.

(51) Int. Cl.
| | |
|---|---|
| A62C 35/00 | (2006.01) |
| A62C 3/16 | (2006.01) |
| A62C 35/10 | (2006.01) |
| A62D 1/00 | (2006.01) |
| H01M 2/10 | (2006.01) |

(52) U.S. Cl.
CPC ............ *A62C 3/16* (2013.01); *A62C 35/10* (2013.01); *A62D 1/0064* (2013.01); *H01M 2/1022* (2013.01); *H01M 2200/10* (2013.01); *H01M 2220/30* (2013.01)

(58) Field of Classification Search
CPC ............................. A62C 35/10; A62D 1/0035
USPC ........................................................ 169/54, 58
See application file for complete search history.

(56) References Cited

U.S. PATENT DOCUMENTS

| | | | | |
|---|---|---|---|---|
| 3,364,097 A | * | 1/1968 | Dunnington | E04B 1/942 428/117 |
| 4,013,190 A | * | 3/1977 | Wiggins | A62C 4/00 220/501 |
| 4,251,579 A | * | 2/1981 | Lee | A62C 35/00 428/73 |
| 4,299,872 A | * | 11/1981 | Miguel | B32B 3/12 428/117 |
| 4,367,799 A | * | 1/1983 | Tarpley, Jr. | A62C 35/02 169/46 |
| 4,574,454 A | * | 3/1986 | Dyson | E05G 1/024 109/65 |
| 4,601,143 A | * | 7/1986 | O'Keefe | E06B 5/162 52/171.3 |
| 4,625,710 A | * | 12/1986 | Harada | F24J 2/34 126/619 |

(Continued)

*Primary Examiner* — Viet Le
(74) *Attorney, Agent, or Firm* — McHale & Slavin, P.A.

(57) ABSTRACT

Disclosed is a cellular telephone recharging device which operates as a support bed for a cellular telephone during the recharging stage. The device includes a first pocket for retaining a fire extinguishing packet of super absorbent polymer capable of extinguishing a lithium battery fire. A second pocket is formed within the device for positioning of the cellular telephone over the fire extinguishing packet. Use of the device reduces or eliminates thermal meltdowns by positioning the fire suppressant directly adjacent to the most likely area for the thermal meltdown.

7 Claims, 3 Drawing Sheets

(56) References Cited

U.S. PATENT DOCUMENTS

| | | | | |
|---|---|---|---|---|
| 4,830,913 | A * | 5/1989 | Ortmans | B32B 17/10311 428/34 |
| 4,964,936 | A * | 10/1990 | Ferro | C08J 9/36 156/242 |
| 4,989,750 | A * | 2/1991 | McGarvey | B65D 90/501 220/483 |
| 5,092,024 | A * | 3/1992 | McGarvey | B65D 90/501 220/560.01 |
| 5,175,197 | A * | 12/1992 | Gestner | C09D 5/34 252/606 |
| 5,223,313 | A * | 6/1993 | Holzer | B32B 17/10311 428/192 |
| 5,271,493 | A * | 12/1993 | Hall | B65D 90/028 220/565 |
| 5,309,690 | A * | 5/1994 | Symons | E04C 2/365 428/116 |
| 5,338,349 | A * | 8/1994 | Farrar | C04B 26/04 106/15.05 |
| 5,390,580 | A * | 2/1995 | Gibbons, Jr. | F41H 5/0457 109/49.5 |
| 5,490,566 | A * | 2/1996 | Purser | A62C 35/10 169/26 |
| 5,547,720 | A * | 8/1996 | Rittler | B32B 17/10311 428/34 |
| 5,645,926 | A * | 7/1997 | Horrocks | A41D 31/0022 442/234 |
| 5,667,866 | A * | 9/1997 | Reese, Jr. | B32B 3/12 428/116 |
| 5,989,446 | A * | 11/1999 | Hicks | A62D 1/0042 106/18.11 |
| 6,019,237 | A * | 2/2000 | Durham | B65D 88/14 109/49.5 |
| 6,026,975 | A * | 2/2000 | Slater | B65D 90/028 220/565 |
| 6,095,252 | A * | 8/2000 | Draugelates | H02G 3/0412 169/58 |
| 6,257,437 | B1 * | 7/2001 | Slater | B65D 90/028 220/567 |
| 6,686,003 | B2 * | 2/2004 | Legare | A62C 3/00 220/560.01 |
| 6,874,284 | B1 * | 4/2005 | Hayward | E04H 1/1261 52/220.2 |
| 6,915,861 | B2 * | 7/2005 | Goodworth | A62C 3/08 169/46 |
| 6,948,567 | B1 * | 9/2005 | Cyphers | A62C 35/02 169/54 |
| 7,090,029 | B2 * | 8/2006 | Cleary | A62C 3/0235 169/36 |
| 7,240,513 | B1 * | 7/2007 | Conforti | A45C 13/02 62/457.2 |
| 7,246,717 | B2 * | 7/2007 | Rodgers | B65D 90/028 206/319 |
| 7,284,726 | B2 * | 10/2007 | Fabian | B32B 3/12 244/17.11 |
| 7,385,480 | B2 * | 6/2008 | Fitzpatrick | A62C 99/0045 169/58 |
| 7,832,324 | B2 * | 11/2010 | Green | A62D 5/00 89/36.02 |
| 7,916,487 | B2 * | 3/2011 | Bitton | G06F 21/70 174/50 |
| 7,992,647 | B2 * | 8/2011 | Cordani | B64D 25/00 169/30 |
| 8,240,110 | B2 * | 8/2012 | Griffiths | E04C 1/42 52/232 |
| 8,439,123 | B2 * | 5/2013 | Bennett | A62C 3/07 169/28 |
| 8,578,866 | B2 * | 11/2013 | Luling | E05G 1/005 109/49.5 |
| 8,745,795 | B2 * | 6/2014 | Klancnik | A47C 27/001 5/483 |
| 8,875,802 | B2 * | 11/2014 | Jesclard, Jr. | A62C 8/06 169/48 |
| 8,887,515 | B2 * | 11/2014 | Patstone | F25D 3/08 62/457.2 |
| 9,169,044 | B2 * | 10/2015 | Eckholm, II | F42B 39/16 |
| 2002/0056713 | A1 * | 5/2002 | Rose | B32B 15/04 220/62.11 |
| 2003/0004247 | A1 * | 1/2003 | Destandau | B32B 1/06 524/437 |
| 2005/0118383 | A1 * | 6/2005 | Cargill | A61F 7/02 428/68 |
| 2006/0278412 | A1 * | 12/2006 | Hodges | A62C 3/07 169/60 |
| 2007/0001156 | A1 * | 1/2007 | Toreki, III | A62D 1/0064 252/601 |
| 2007/0289752 | A1 * | 12/2007 | Beck | A62D 1/0035 169/47 |
| 2008/0017392 | A1 * | 1/2008 | Fallis | A62C 3/065 169/46 |
| 2016/0059056 | A1 * | 3/2016 | Hoffman, III | A62C 3/002 169/58 |

\* cited by examiner

27
CELLULAR TELEPHONE SUPPORT BED FOR RECHARGE

PRIORITY CLAIM

In accordance with 37 C.F.R. § 1.76, a claim of priority is included in an Application Data Sheet filed concurrently herewith. Accordingly, the present invention claims priority as a continuation-in-part of U.S. patent application Ser. No. 14/682,542, entitled "FIRE SUPPRESSION PACKAGING", filed Apr. 9, 2015, which is a continuation-in-part of U.S. patent application Ser. No. 14/620,925, entitled "FIRE SUPPRESSION PACKAGING AND METHOD OF MANUFACTURE", filed Feb. 12, 2015, which claims priority to U.S. Provisional Patent Application No. 62/064,011, entitled "BATTERY STORAGE DEVICE AND METHOD OF MANUFACTURE", filed Oct. 15, 2014. The contents of the above referenced applications are incorporated herein by reference.

FIELD OF THE INVENTION

This invention relates to the field of fire protection, and more particularly, to a device for use with a recharging cellular telephone, having a hydrated amount of super absorbent polymer constructed and arranged to arrest and extinguish a cellular telephone battery fire.

BACKGROUND OF THE INVENTION

The problem with cellular telephone fires is well known. Samsung Galaxy Note 7 is likely the most well known smart phone battery failure due to a major recall. However, Samsung is not alone with lithium battery fires being a problem. Dell also had problems that affected nearly six million computers. Unfortunately, all lithium batteries are at risk should there be a flaw in manufacturing, or if the lithium battery is not properly recharged. Poor manufacturing can result in latent electrical short circuits. Overcharging can result in oxygen bubbles forming in the lithium gel, which is reactive with metallic lithium. Thermal runaway is also common, the result of a feedback loop in which a lithium battery can quickly overheat and explode.

Even the best made lithium batteries can fail. For instance, recharging a battery in a sub freezing temperature can cause permanent plating of the metallic lithium, which can lead to battery failure. Breach of the housing can also cause lithium to catch fire when it is exposed to oxygen or water.

The Department of Transportation (DOT), through the Pipeline and Hazardous Materials Safety Administration (PHMSA), recognized the problem as far back as 2008, and prohibits loose lithium batteries in checked baggage. Many planes now include charging terminals at the passenger seat. However, since recharging of a telephone is known to uncover latent defects, the charging of telephones poses a fire risk.

SUMMARY OF THE INVENTION

Disclosed is a cellular telephone support bed for use during the recharging stage. When a cellular telephone is in need of recharge, the telephone is placed on the support during the recharge period. Should the lithium battery fail during the recharge, a packet containing an admixture capable of suppressing or extinguishing a lithium battery fire is placed within the support. The packet includes a hydrated super absorbent polymer in a package thin enough to be placed beneath the cellular telephone, positioning the packet adjacent to the smart phone battery. Should an arcing of the lithium battery occur, the packet will release the admixture to extinguish the battery fire. The admixture is used to saturate the immediate area around the battery, further providing a benefit of cooling down the battery. The admixture viscosity inhibits flowing to adjacent areas and is non-conductive.

Accordingly, it is an objective of the present invention to provide a recharging station having an insert packet containing an admixture of non-conductive hydrated super absorbent polymer for extinguishment of lithium battery fires associated with cellular telephones.

It is still yet another objective of the present invention to provide a packet with an admixture of hydrated super absorbent polymer having a viscosity that will retain a shape for a period of time. The viscosity also enables the admixture to adhere to horizontal, vertical, inclined, and curved surfaces.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Figure 1:
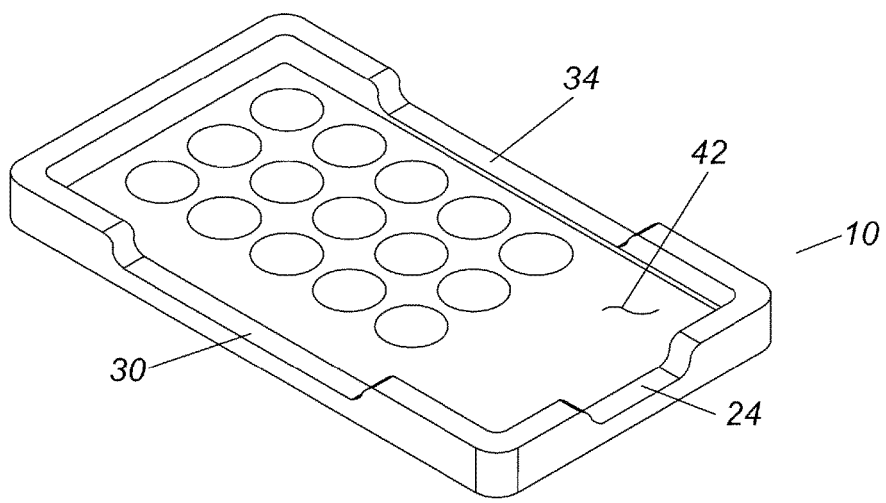
FIG. 1 is a perspective view of the recharging base.
Figure 2:
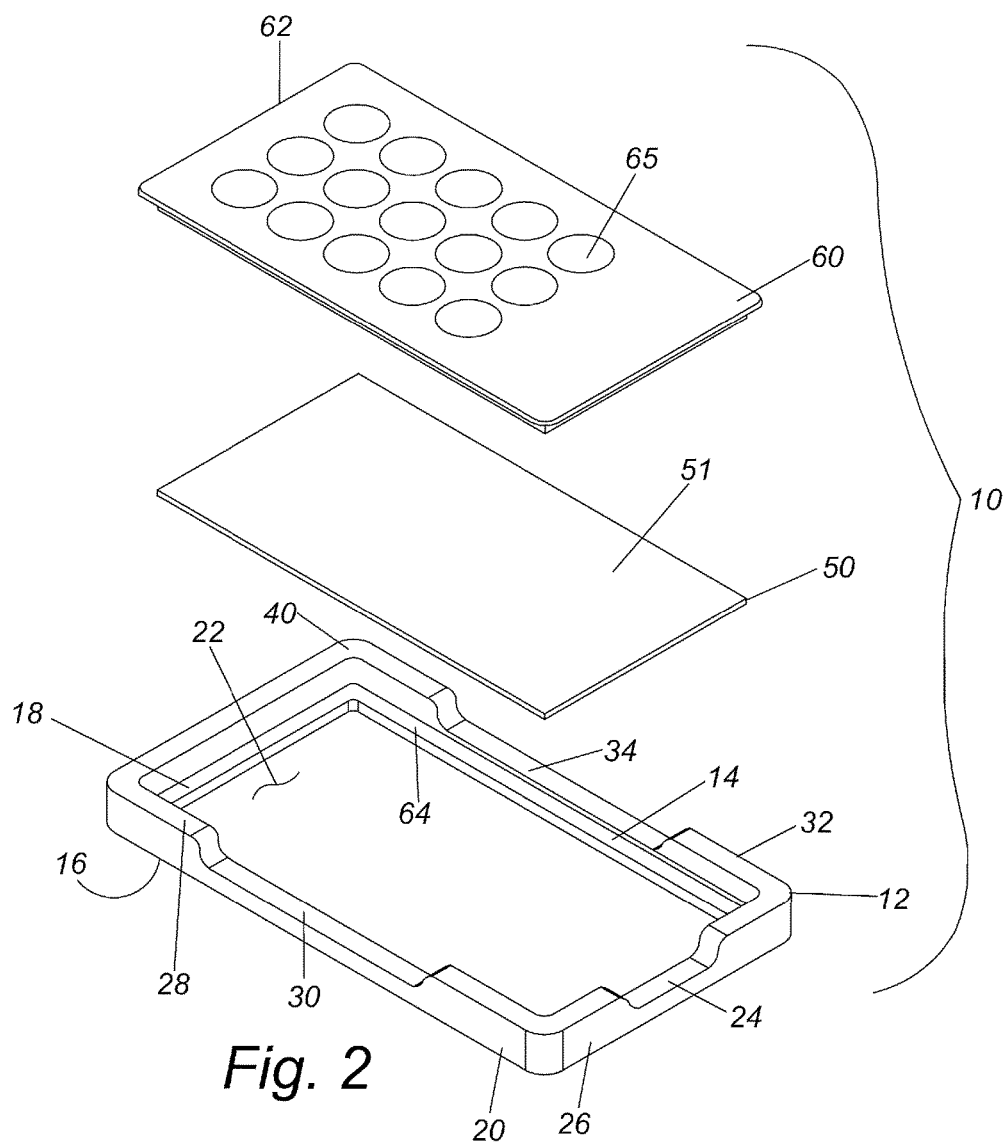
FIG. 2 is an exploded view thereof.
Figure 3:
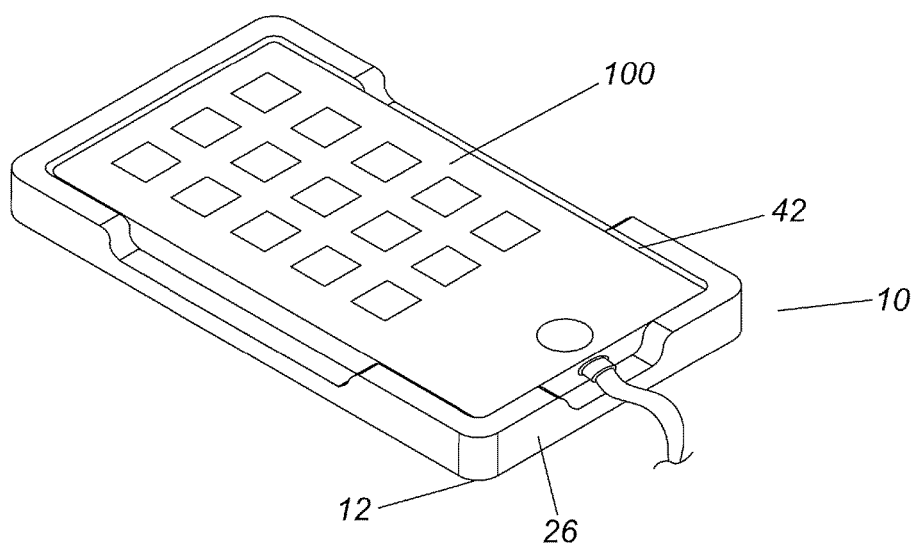
FIG. 3 is a pictorial view of the recharging base with a cellular telephone.

Referring now to the figures, set forth is a cellular phone recharging device 10 constructed from a rectangular shaped material forming a base 12 having an upper surface 14 and a lower surface 16. The base 12 includes a first continuous side wall 18 formed along an upper edge 20 of the base 12, forming a first pocket 22. The first pocket 22 is constructed and arranged to receive a packet containing fire extinguishing material as later explained. The base includes a second continuous side wall 40 running along an upper edge of the first continuous side wall 18. The second continuous side wall 40 forms a second pocket 42, which is constructed and arranged to hold a cellular telephone. The second continuous side wall 40 includes a scallop 24 located along an end 26 of the base 12. The scallop 24 is constructed and arranged to allow access to a power plug attachment 102 when a cellular telephone 100 is placed within the second pocket 42. A left side 28 of the second continuous side wall 40 includes a scallop 30 to allow an individual ease of access to the cellular telephone when placed on the base for purposes of removal. Similarly, a right side 32 of the second continuous side wall 40 includes a scallop 34, wherein an individual is able to grasp both sides of the cellular telephone when placed within the second pocket 42.

A fire suppressant packet 50 is sized to fit within the first pocket 22 formed by the first continuous side wall 18 and the upper surface 14 of the base 12. The packet 50 is a sealed pouch for holding about 3 ounces of an admixture 51 of a potassium based super absorbent polymer and water. The packet is constructed and arranged to fit within the first pocket 22 for securement beneath a lid 60. The aqueous admixture of the super absorbent polymer has properties which enable the polymer to be confined to a particular area because of its relatively high viscosity. The properties of the admixture, in particular its viscosity, enable the admixture to remain on vertical, horizontal, and curved surfaces formed by the packet. Unlike pure water, the admixture does not provide an electrically conductive path. The present invention adds a predetermined amount of polymer to a predetermined amount of water to obtain an admixture which has properties that enable the dissipation of heat and suppress the spread of a battery fire. In this embodiment, about one tablespoon of material is employed, as the admixture will be juxtapositioned to the battery. It is to be understood that the ratio of super absorbent polymer to water can vary to produce various physical states of the super absorbent polymer. For example, the viscosity can be adjusted to form a gel, slurry, liquid, semi-liquid, and/or foam. In a preferred embodiment, the ratio of super absorbent polymer to water is adjusted to produce a gel.

The fire suppressant packet 50 is formed from a material selected from the group of low density plastic materials such as polypropylene, polyethylene, polyurethane, polyisoprene, plastics, or combinations thereof. The use of a flexible material is selected for its ability to be flexible and leak resistant, with an ability to hold the hydrated material over a long period of time without evaporation. Polypropylene is a preferred embodiment. The insert packet can be flexible, semi-flexible, or rigid, or combinations thereof.

As used herein, a "fire suppressant" and "fire extinguishing" composition is used interchangeably, and is meant to be inclusive of all components of the composition. In some embodiments, the fire extinguishing composition comprises one or more fire suppressant compounds. In other embodiments, the fire extinguishing composition comprises one or more common components of fire suppressant formulations, such as: fire suppressant salts, known or conventional fire suppressants, corrosion inhibitors, spoilage inhibitors, foaming agents, non-foaming agents, flow conditioners, stability additives, thickening agents, pigments, dyes or the like.

Approximately one tablespoon of super absorbent polymer is placed within the packet. The admixture is a biodegradable, super absorbent, aqueous-based cross-linked modified polyacrylamide/potassium acrylate polymer. Other polymers may be used, but not with the same quality level. Examples of these polymers are cross-linked modified polyacrylamides/sodium acrylate, carboxy-methylcellulose, alginic acid, cross-linked starches, and cross-linked polyaminoacids. Preferably, the super absorbent polymer is an admixture of polyacrylamides/potassium acrylate marketed under the trademark FIREICE® by the company GelTech Solutions, Inc. In some embodiments, the fire suppressant or fire extinguishing composition is a biodegradable, super absorbent, aqueous-based polymer. The fire extinguishing admixture or fire suppressant may also be any known or conventional fire suppressants. Examples of known fire suppressants include, without limitation, those marketed under the brand name Barricade II, marketed by Barricade International, Thermo Gel 500p marketed by Thermo Industries, AFG Firewall marketed by NoChar, Phos-Chek, Aqua-Gel-K, Focstop-K or Insul-8 marketed by ICL Performance Products, Blaze Tamer 380 marketed by Bio Central Labs, and Tetra KO marketed by Earth Clean Corporation. Other known materials that can be made effective include Purple K potassium bicarbonate, mono ammonium phosphate, sodium bicarbonate, potassium bicarbonate & Urea Complex (AKA Monnex), potassium chloride (Super-K), MET-L-KYL/PYROKYL) variation of sodium bicarbonate, a blended sodium chloride, or a copper extinguishing agent such as that developed by the U.S. Navy for fighting lithium and lithium alloy fires. The copper compound smothers the fire and provides an excellent heat sink for dissipating heat.

A lid 60 is securable to the first continuous side wall 18 to maintain the packet 50 within the first pocket 22. Positioning of the packet behind the cellular telephone is critical if the thermal meltdown is to be immediately neutralized. The lid 60 has an outer edge 62 which fits within a groove 64 formed above the first continuous side wall 18 and along a lower portion of the second continuous side wall 40. The edge 62 of the lid 60 slips within the groove 64 with is preferably formed around the inner surface of the continuous sidewall. The lid 60 secures the packet 50 in the proper position behind the cellular telephone battery area. The lid 60 includes at least one aperture 65 to allow fluid flow from the packet 50, when it is breached, to contact the area of the thermal meltdown. In the event of a thermal meltdown of the lithium battery, the packet 50 is breached by the thermal heat, allowing release of the super absorbent material directly against the cellular telephone. For this reason, a plurality of apertures, as depicted, is desired to allow the super absorbent polymer to contact the area of thermal meltdown as quickly as possible. When the lid is in position, the second pocket 42 forms an area for the placement of a cellular telephone 100. A power cord 102 is illustrated extending through the scallop 24.

The base 12 is constructed from a heat-resistant material, such as plastic or rubber. The base 12 can be shaped to allow the cellular phone 100 to fit snugly within the second pocket 42, wherein the base operates as a non-slip, non-marring support that placed on most any surface during the recharging stage. Additionally the base 12 can be oversized so as to allow different sized phones to be placed in the second pocket 42. It is recognized that the most opportune moment for extinguishing a lithium fire is at the point of creation; thus, the necessity to have an extinguishing material directly contact the thermal breakdown as quickly as possible is critical. The super absorbent polymer also operates to distribute thermal heat during a recharge stage, allowing the cellular telephone to be recharged on heat sensitive objects.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A cellular phone recharging support platform bed comprising: a base formed from a rectangular shaped material having an upper surface and a lower surface; a first continuous side wall formed along an upper edge of said base forming a first pocket; a fire suppressant packet positionable within said first pocket; a lid securable to said first continuous side wall, securing said packet in said first pocket; a second continuous side wall formed along an upper edge of said first continuous side wall forming a second pocket, said second pocket constructed and arranged with an opening to receive a cellular phone; wherein a cellular phone positioned within said second pocket is protected from overheating by said fire suppressant packet.

2. The cellular phone recharging device according to claim 1 wherein said base is constructed from a heat resistant material selected from the group of plastic or rubber.

3. The cellular phone recharging device according to claim 1 wherein said fire suppressant packet contains about 3 ounces of liquid fire extinguishing material.

4. The cellular phone recharging device according to claim 1 wherein said lid has at least one aperture.

5. The cellular phone recharging device according to claim 1 wherein said second continuous side wall includes a groove for receipt of an outer edge of said lid, said groove maintaining said lid in a fixed position.

6. The cellular phone recharging device according to claim 1 wherein said second continuous side wall includes a bottom scallop along an end of said base, said bottom scallop constructed and arranged to allow a power plug to be attached to said cellular phone when said cellular phone is placed in said second pocket.

7. The cellular phone recharging device according to claim 1 wherein said second continuous side wall includes a side scallop along each side of said base, said side scallops constructed and arranged to allow an individual to grasp a cellular phone placed in said second pocket.

\* \* \* \* \*